United States Patent
Huppe et al.

(10) Patent No.: US 10,100,730 B2
(45) Date of Patent: Oct. 16, 2018

(54) SECONDARY AIR SYSTEM WITH VENTURI

(71) Applicant: Pratt & Whitney Canada Corp., Longueuil (CA)

(72) Inventors: Roger Huppe, Chambly (CA); Pierre-Yves Legare, Chambly (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 455 days.

(21) Appl. No.: 14/644,503

(22) Filed: Mar. 11, 2015

(65) Prior Publication Data
US 2016/0265432 A1   Sep. 15, 2016

(51) Int. Cl.
*F02C 6/08* (2006.01)
*F01D 9/06* (2006.01)
(Continued)

(52) U.S. Cl.
CPC ............... *F02C 6/08* (2013.01); *F01D 9/065* (2013.01); *F01D 17/10* (2013.01); *F02C 7/18* (2013.01); *F02K 3/00* (2013.01); *F02K 3/06* (2013.01); *F05D 2260/60* (2013.01); *F05D 2260/601* (2013.01)

(58) Field of Classification Search
CPC ...... F02C 3/13; F02C 6/04; F02C 6/06; F02C 6/08; F02C 7/12; F02C 7/16; F02C 7/18; F02C 9/18; F02C 7/06; F05D 2270/303; F05D 2270/313; F05D 2260/601; F05D 2260/98; F01D 5/046; F01D 5/08;
(Continued)

(56) References Cited

U.S. PATENT DOCUMENTS 2,474,404 A * 6/1949 Richeson .................. F02C 7/16
415/114
2,618,431 A   11/1952 Walker
(Continued)

FOREIGN PATENT DOCUMENTS

EP   2146057   1/2010
GB   827870 A   2/1960

OTHER PUBLICATIONS

Department of the Army and the Air Force, Technical Manual, Aviation Unit and Intermediate Maintenacne Manual Engine Assembly, Mar. 9, 1981, TM 55-2840-229-23-1, pp. 1-12, 1-41, 1-43 and 1-44.*
(Continued)

*Primary Examiner* — Gerald L Sung
*Assistant Examiner* — Marc Amar
(74) *Attorney, Agent, or Firm* — Norton Rose Fulbright Canada LLP (57) ABSTRACT

A gas turbine engine including a secondary air system with interconnected fluid passages defining at least one flow path between a common source of pressurized air and a common outlet. Some of the fluid passages deliver the pressurized air to components of the gas turbine engine. The fluid passages include a common fluid passage through which all circulation of the pressurized air to the common outlet passes. The common fluid passage has a section including a venturi configured for controlling a flow of the pressurized air from the source to the outlet. In one embodiment, the venturi is provided in a common inlet or common outlet passage. A method of pressurizing a secondary air system is also discussed.

16 Claims, 5 Drawing Sheets

(51) Int. Cl.
 *F01D 17/10* (2006.01)
 *F02K 3/06* (2006.01)
 *F02C 7/18* (2006.01)
 *F02K 3/00* (2006.01)

(58) Field of Classification Search
 CPC .......... F01D 5/085; F01D 9/065; F01D 25/18; F01D 25/183; F01D 25/186; F01D 25/125
 See application file for complete search history.

(56) References Cited

U.S. PATENT DOCUMENTS

| | | | |
|---|---|---|---|
| 2,636,665 A * | 4/1953 | Lombard | F01D 5/08 415/115 |
| 3,058,695 A * | 10/1962 | Simonis | B64C 23/005 137/496 |
| 3,092,128 A | 6/1963 | Pembleton | |
| 3,192,848 A | 7/1965 | Townsend | |
| 3,473,727 A | 10/1969 | Eastman | |
| 3,511,576 A | 5/1970 | Herbstritt et al. | |
| 3,844,110 A * | 10/1974 | Widlansky | F02C 7/06 184/6.11 |
| 3,878,692 A | 4/1975 | Steves | |
| 3,924,960 A | 12/1975 | Harner et al. | |
| 3,943,703 A * | 3/1976 | Kronogard | F01D 5/025 415/217.1 |
| 5,155,991 A | 10/1992 | Bruun | |
| 5,155,993 A | 10/1992 | Baughman et al. | |
| 5,555,721 A | 9/1996 | Bourneuf et al. | |
| 6,327,844 B1 * | 12/2001 | Kaminske | F04D 29/644 60/782 |
| 6,393,825 B1 | 5/2002 | Leone et al. | |
| 6,416,279 B1 | 7/2002 | Weigand et al. | |
| 6,550,253 B2 * | 4/2003 | Mortzheim | F01D 17/105 60/782 |
| 6,912,895 B1 | 7/2005 | Jaeger | |
| 7,056,103 B2 | 6/2006 | LaRue | |
| 7,278,826 B2 | 10/2007 | Blaskovich et al. | |
| 7,287,384 B2 | 10/2007 | Fish et al. | |
| 7,591,631 B2 | 9/2009 | Hendricks et al. | |
| 7,707,836 B1 | 5/2010 | Barnes et al. | |
| 7,861,512 B2 | 1/2011 | Olver et al. | |
| 8,033,118 B2 | 10/2011 | Monteiro et al. | |
| 8,302,407 B2 | 11/2012 | Alecu et al. | |
| 8,371,127 B2 | 2/2013 | Durocher et al. | |
| 8,464,761 B2 | 6/2013 | Young et al. | |
| 8,511,096 B1 | 8/2013 | Haugen et al. | |
| 8,757,508 B2 | 6/2014 | Haasz et al. | |
| 8,820,086 B2 * | 9/2014 | Bailey | F23K 5/14 60/734 |
| 8,827,632 B1 | 9/2014 | Lee et al. | |
| 9,188,016 B2 | 11/2015 | Carrier et al. | |
| 9,260,974 B2 | 2/2016 | Hasting et al. | |
| 9,297,310 B2 | 3/2016 | Giri et al. | |
| 9,303,526 B2 | 4/2016 | Chir et al. | |
| 9,316,152 B2 | 4/2016 | Subbareddyar et al. | |
| 9,410,429 B2 | 8/2016 | Watson et al. | |
| 2004/0074537 A1 * | 4/2004 | Roots | B64D 13/00 137/487.5 |
| 2005/0210882 A1 | 9/2005 | Winstanley | |
| 2007/0125092 A1 * | 6/2007 | Wolfe | F01D 17/105 60/782 |
| 2008/0057848 A1 | 3/2008 | Gray et al. | |
| 2009/0293495 A1 | 12/2009 | Correia et al. | |
| 2010/0011779 A1 * | 1/2010 | Senior | F01D 17/105 60/785 |
| 2012/0180488 A1 * | 7/2012 | Bailey | F23K 5/14 60/739 |
| 2013/0111909 A1 | 5/2013 | Khan et al. | |
| 2014/0150401 A1 * | 6/2014 | Venter | F02C 7/36 60/39.45 |
| 2014/0248122 A1 | 9/2014 | Vetters et al. | |
| 2016/0265432 A1 | 9/2016 | Huppe et al. | |
| 2017/0097011 A1 * | 4/2017 | Pallot | F04D 29/542 |
| 2017/0218853 A1 | 8/2017 | Mackin et al. | |

OTHER PUBLICATIONS

Department of the Army and the Air Force, Technical Manual, Aviation Unit and Intermediate Maintenacne Manual Engine Assembly, Mar. 9, 1981, TM 55-2840-229-23-2, p. 4-258.*
Flight International, Textron Lycoming LF507, Engine for Change, Aug. 25-31, 1993, pp. 39-43.*
Webpage of Connecticut Air & Space Center (https://cascstratford.wordpress.com/exhibits/engines/lycoming-t53/), snapshot on Sep. 24, 2014 (Wayback Machine), Lycoming T53, p. 1.*

* cited by examiner

SECONDARY AIR SYSTEM WITH VENTURI

TECHNICAL FIELD

The application relates generally to gas turbine engines and, more particularly, to secondary air systems for such engines.

BACKGROUND OF THE ART

Secondary air systems in gas turbine engines use pressurized air bled from the compressor for many purposes, including cooling and pressuring seals to reduce the risk of leaks. However, the pressurized air bled from any location within the compressor has a pressure which typically varies throughout the range of operation of the engine. For example, the pressure of the bleed air of the compressor increases when the engine is operated at a full power level in contrast to an idling condition. Accordingly, it is known to have a secondary air system using bleed air from a first location in the compressor at high power, and from a second location downstream of the first location in the compressor at low power, for example such as to ensure sufficient pressure and airflow within the system throughout the range of engine power. Such systems thus necessitate a valve to switch between the two pressure sources, and control logic to control the valve to connect to the correct source.

SUMMARY

In one aspect, there is provided a gas turbine engine comprising: a compressor providing a source of pressurized air; a secondary air system including a plurality of interconnected fluid passages defining at least one flow path between the source of pressurized air and a common outlet communicating with an environment of the gas turbine engine, some of the plurality of fluid passages communicating with components of the gas turbine engine for delivery of the pressurized air thereto, the plurality of fluid passages includes a common fluid passage through which all circulation of the pressurized air to the common outlet passes, the common fluid passage including a venturi configured for controlling a flow of the pressurized air from the source of pressurized air to the common outlet through the plurality of fluid passages.

In another aspect, there is provided a gas turbine engine comprising: a compressor defining a source of pressurized air; a secondary air system including: an inlet passage communicating with the source of pressurized air; an outlet passage communicating with an environment of the gas turbine engine; and a plurality of interconnected additional passages communicating between the inlet passage and the outlet passage; wherein one of the inlet and outlet passages has a section of constricted internal cross-section configured for controlling a flow of the pressurized air therethrough.

In a further aspect, there is provided a method of pressurizing a secondary air system in a gas turbine engine, the method comprising: circulating pressurized air from a source of pressurized air to a plurality of interconnected fluid passages; circulating the pressurized air through the fluid passages to deliver the pressurized air to a plurality of components of the gas turbine engine; exhausting the pressurized air from the fluid passages to an environment of the gas turbine engine through an outlet located downstream of the plurality of components, wherein all the pressurized air exhausted through the outlet circulates through a common one of the fluid passages before being exhausted; at low power, accelerating a flow of the pressurized air through the common one of the fluid passages, the flow being accelerated by circulation through a venturi defined in the common one of the fluid passages; and at high power, choking the flow of the pressurized air through the venturi, wherein accelerating and choking the flow controls a pressure drop of the pressurized air throughout the fluid passages.

DESCRIPTION OF THE DRAWINGS

Reference is now made to the accompanying figures in which.

DETAILED DESCRIPTION

Figure 1:
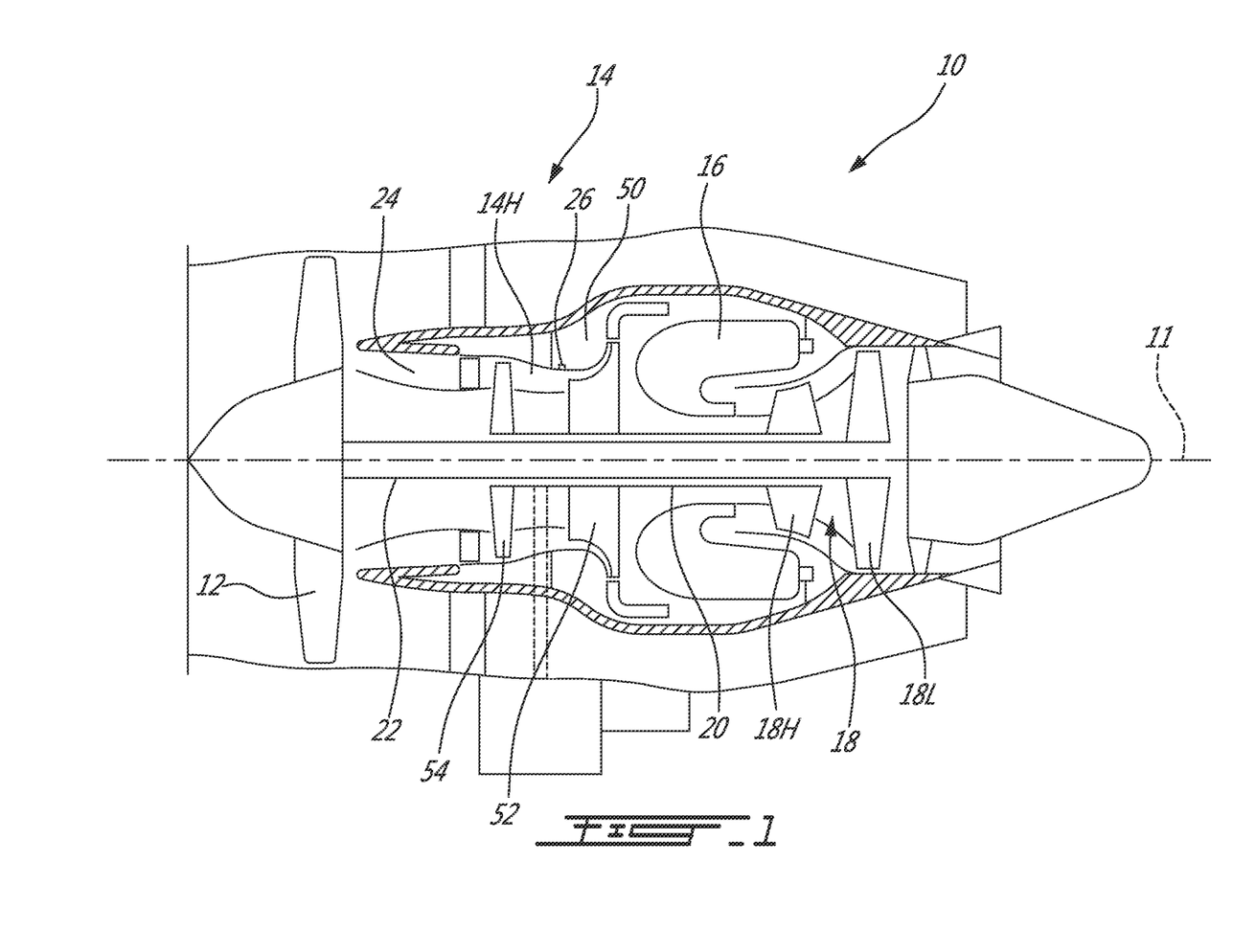
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 includes a high pressure compressor 14H, with one or more compressor rotor(s) drivingly engaged to a high pressure shaft 20 of the engine 10; the high pressure shaft 20 is driven by the one or more rotor(s) of a high pressure turbine 18H forming part of the turbine section 18. A low pressure shaft 22 extends within and concentric with the high pressure shaft 20, and is engaged at one end to the fan 12, and at the other end to one or more rotor(s) of a low pressure turbine 18L of the turbine section 18. Although not shown, the compressor section 14 may also include one or more low compressor rotor(s) engaged to the low pressure shaft 22. The high pressure and low pressure shafts 20, 22 rotate independently from each other.

Figure 2:
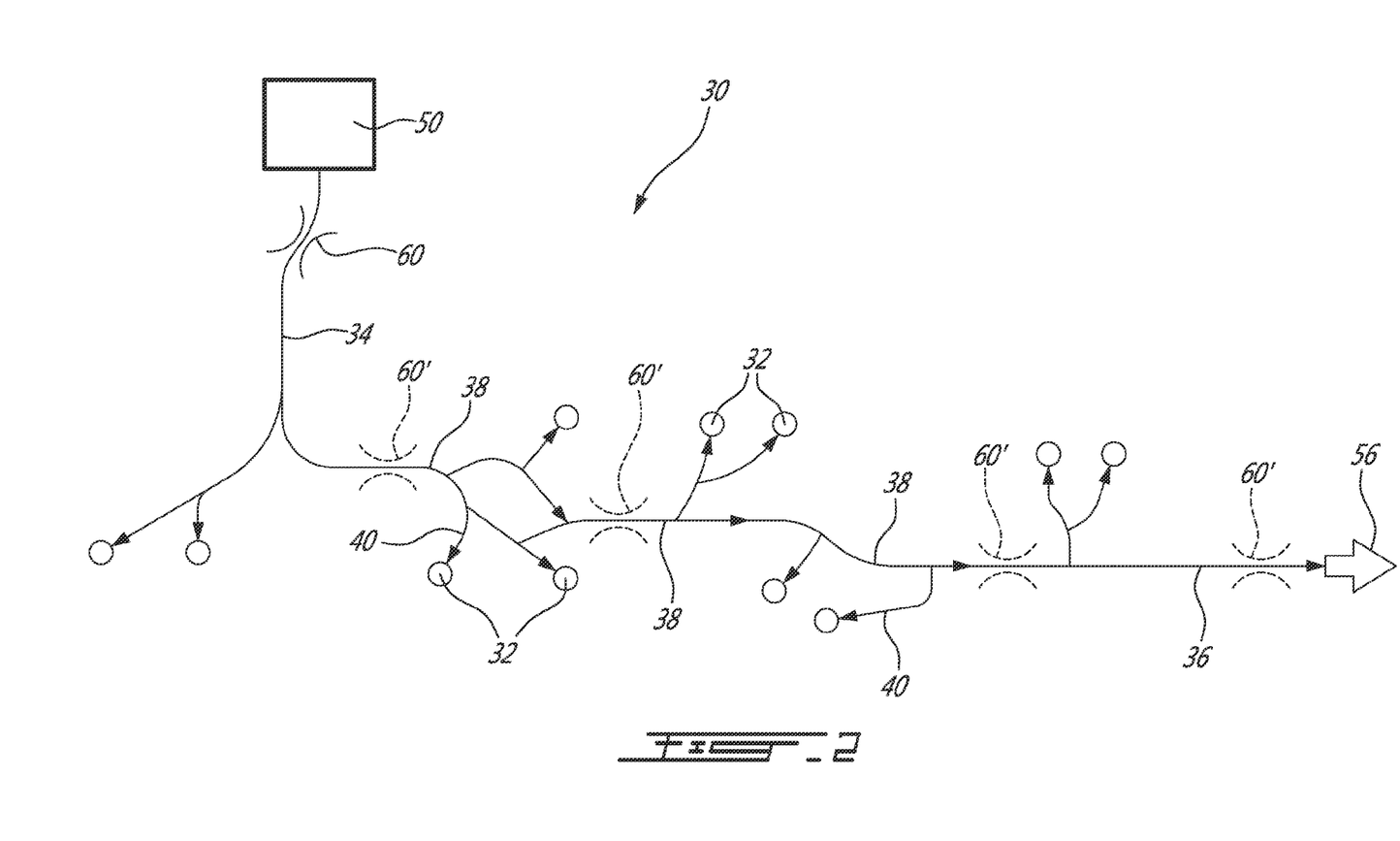
FIG. 2 is a schematic view of a secondary air system which may be used on a gas turbine engine, in accordance with a particular embodiment.

Referring to FIG. 2, a secondary air system 30 delivers pressurized air to a plurality of components 32 of the gas turbine engine 10. In some instances, the pressurized air is delivered for cooling purposes: the components receiving the pressurized air may include, for example, rotors, blades or vanes of the turbine section 18 or of the compressor section 14, shrouds, seals, etc. In other instances, the pressurized air is delivered to apply a back pressure to the component, for example to balance a fluid pressure on the other side of the component: the components receiving the pressurized air may include, for example, seals such as bearing cavity seals and other oil cavity seals. It is understood that the pressurized air may perform more than one function on a same component.

The secondary air system 30 generally includes a plurality of interconnected fluid passages. In the embodiment shown, the fluid passages include a common inlet passage 34, a common outlet passage 36, and additional passages 38, 40, some of which "branching out" from others, for example to deliver the pressurized air to the various gas turbine engine components 32. The fluid passages 34, 36, 38, 40 are all in communication, either directly or through one another, with a common source 50 of pressurized air. In the embodiment shown, the communication with the common source 50 is provided through the common inlet passage 34.

The source 50 of pressurized air is defined in the compressor section 14. In a particular embodiment, and with reference to FIG. 1, the source 50 of pressurized air is a plenum defined around the annular gas path 24 of the engine receiving the blades of the compressor rotors. The plenum 50 communicates with the annular gas path 24 through one or more ports 26 defined through the outer wall of the gas path 24 of the high pressure compressor 14H. In the embodiment shown, a centrifugal rotor 52 is provided at the downstream end of the high pressure compressor 14H, and the port(s) 26 are provided between the centrifugal rotor 52 and the axial compressor rotor 54 immediately upstream of it. It is however understood that in other embodiments, the source 50 of pressurized air could bleed air from a different location of the compressor section 14, depending on the pressure requirements of the secondary air system 30 on the pressure profile within the compressor section 14, and on the engine configuration, including, but not limited to, any stage along the high pressure compressor 14H, upstream of any rotor/at the exit of any stator of the compressor section 14, along the impeller shroud of the centrifugal rotor 52, at the tip of the blades of the centrifugal rotor 52, and through the inner gas path wall.

Referring back to FIG. 2, the fluid passages 34, 36, 38, 40 are also all in communication, either directly or through one another, with a common outlet 56. In the embodiment shown, the communication with the common outlet 56 is provided through the common outlet passage 36. The outlet 56 communicates with an environment of the gas turbine engine 10, for example by discharging into an unpressurized plenum which is open to atmosphere.

The fluid passages 34, 36, 38, 40 thus define at least one flow path between the common source 50 of pressurized air and the common outlet 56. All of the flow path(s) pass through at least one common fluid passage—all the pressurized air flowing from the common source to the common outlet through the fluid passages thus passes through this/these common fluid passage(s). In the embodiment shown, multiple common fluid passages are provided, including the common inlet passage 34, the common outlet passage 36, and common intermediary passages 38. Other configurations are also possible.

In order to control the flow of the pressurized air from the common source 50 to the common outlet 56, one of the common passages 34, 36, 38 includes a section of constricted internal cross-section forming a venturi 60, such that all of the pressurized air reaching the common outlet 56 has to circulate through this constricted section before being exhausted. In FIG. 2, the venturi 60 is schematically indicated in full lines as being defined in the inlet passage 34, and multiple, non-exhaustive and alternate possible locations for the venturi 60' are schematically shown in dotted lines: in the common outlet passage 36, and in the common intermediary passages 38. The venturi 60 is configured to limit the flow through the fluid passages 34, 36, 38, 40 at high power but not at low power. Accordingly, it defines a control point for the flow of pressurized air through the fluid passages 34, 36, 38, 40.

Figure 5:
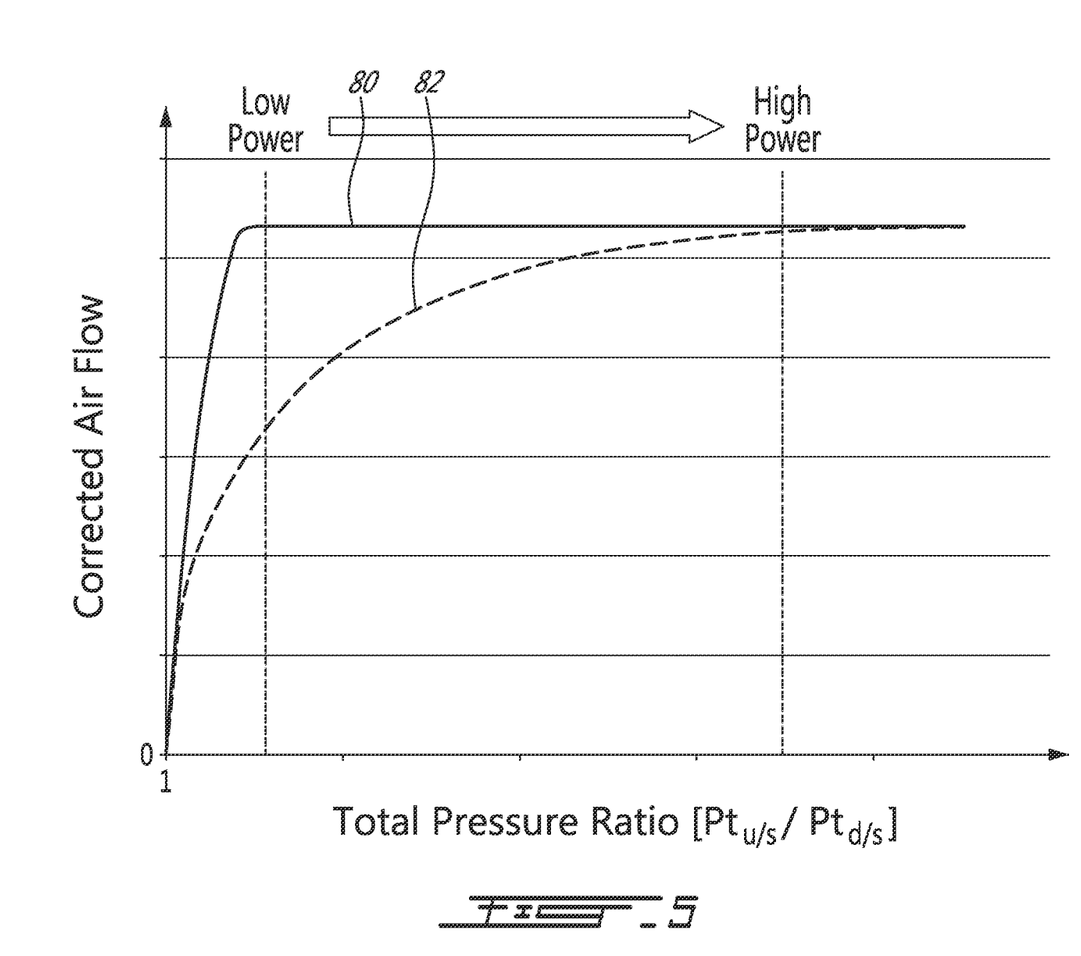
FIG. 5 is a comparative graph of normalized flow through a venturi and through a control orifice.

Referring to FIG. 5 showing the flow as a function of the total pressure ratio ($Pt_{u/s}/Pt_{d/s}$), where $Pt_{u/s}$ is the total pressure upstream of the system and $Pt_{d/s}$ is the total pressure downstream of the system. In a particular embodiment, the flow 80 through the venturi 60 is the same at high power than the flow 82 through an equivalent control orifice (e.g. cylindrical orifice). At low power, the venturi 60 opposes less resistance, and accordingly the flow 80 through the venturi 60 is higher than the flow 82 through the equivalent control orifice. In a particular embodiment, this increased flow through the venturi 60 at low power allows for sufficient flow to be provided to the various engine components 32 receiving pressurized air from the secondary air system 30. At higher power, the venturi 60 accelerates the flow through its smaller section 76, and chokes the flow when its local speed approaches the sonic range. The venturi 60 thus flows freely at low power and limits the flow at high power, thus allowing a more constant flow through the fluid passages throughout variations of power of the engine while using a same source of pressurized air throughout these variations of power.

In a particular embodiment, "low power" designates the power demand on the engine during ground idle and taxi, while "high power" designates the power demand on the engine during take-off, climb and cruise. In a particular embodiment, low power corresponds to a total pressure ratio ($Pt_{u/s}/Pt_{d/s}$) of less than 1.1, and high power to a total pressure ratio of at least 2; other values are also possible, including, but not limited to, low power corresponding to a total pressure ratio of around 1, and/or high power corresponding to a total pressure ratio of at least 3.

Figure 3:
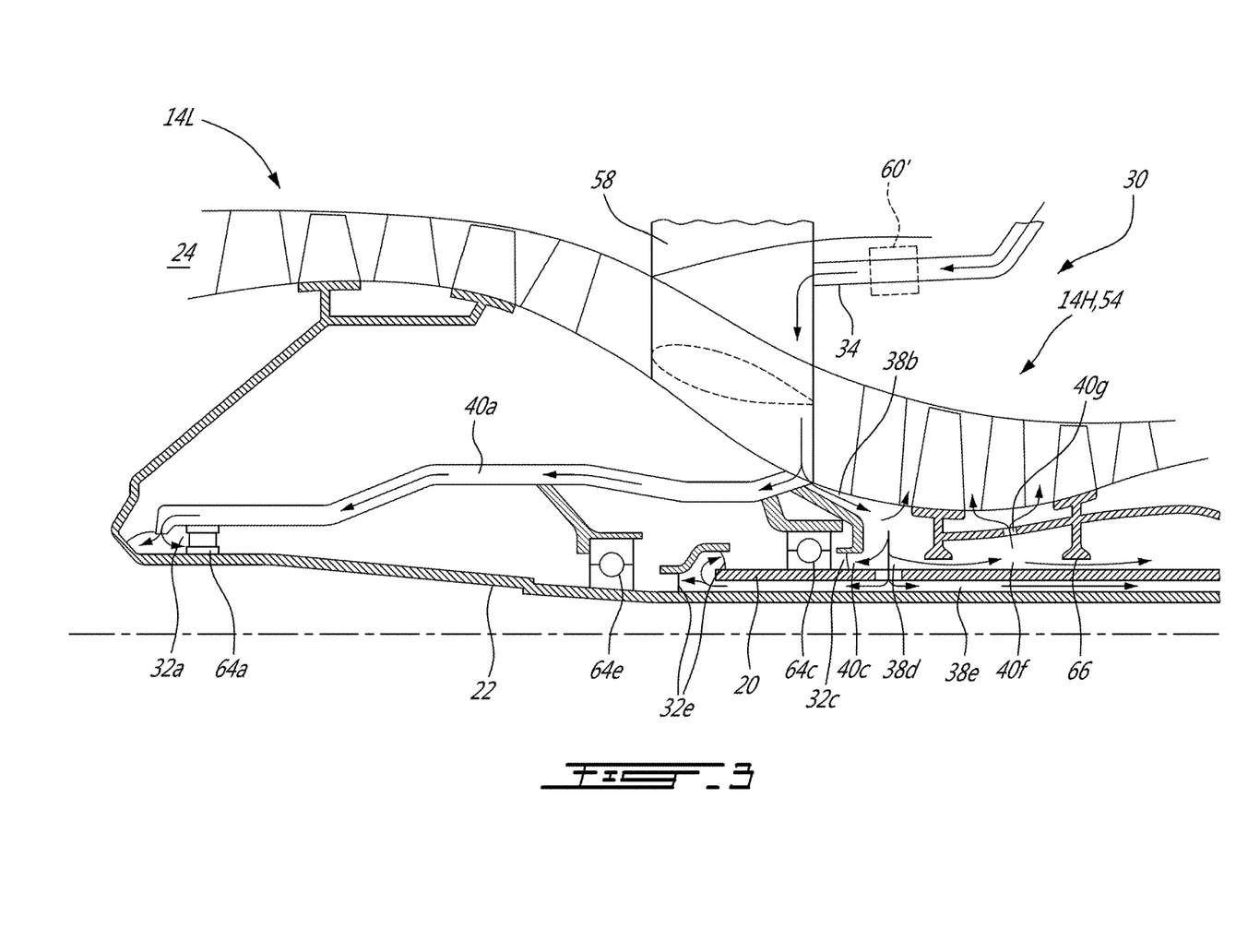
FIG. 3 is a schematic cross-sectional view of a part of a secondary air system in accordance with a particular embodiment.
Figure 4:
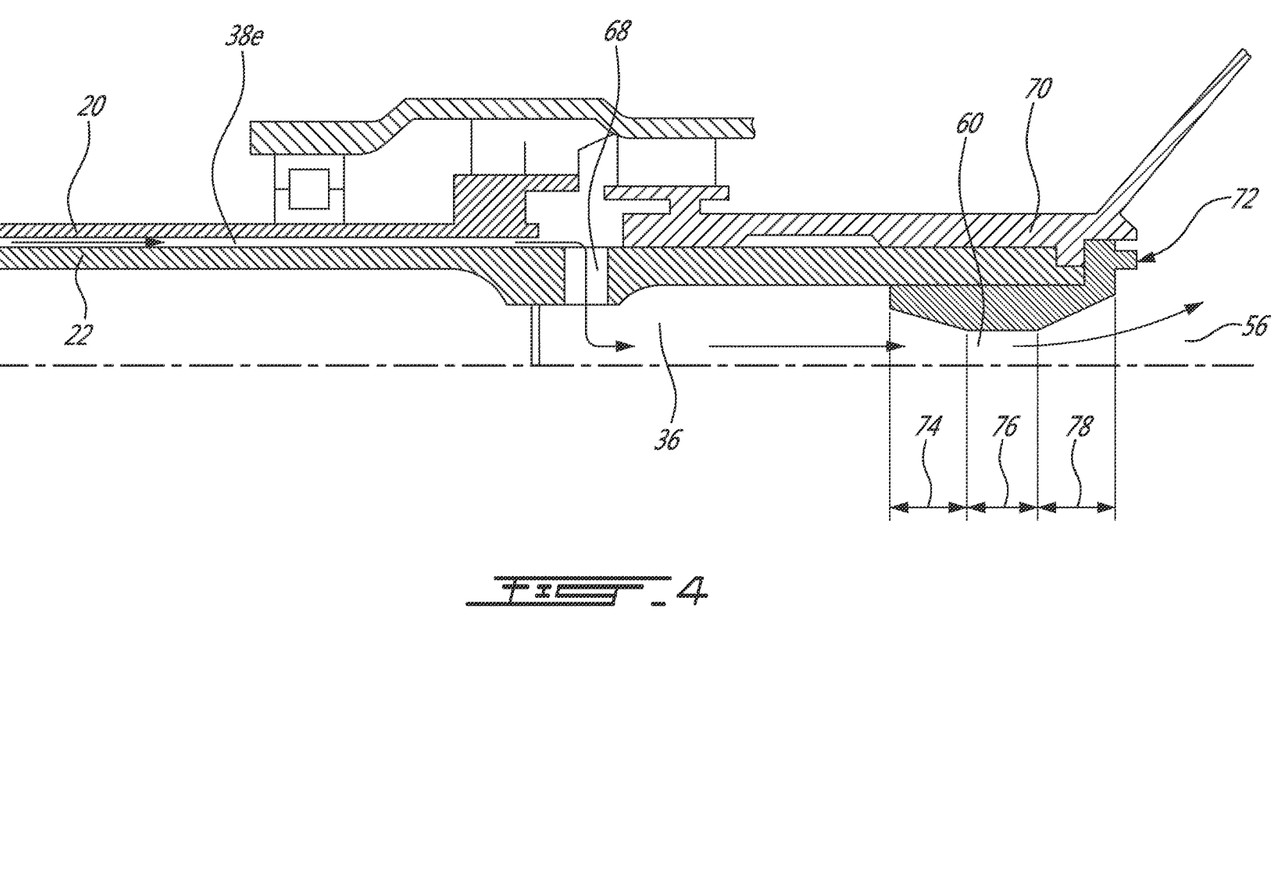
FIG. 4 is a schematic cross-sectional view of another part of the secondary air system of FIG. 3.

Referring to FIGS. 3-4, a particular embodiment of the secondary air system 30 is shown, where the venturi 60 is provided in the outlet passage 36 (FIG. 4); a possible alternate location is indicated at 60' in FIG. 3, as part of the inlet passage 34.

Referring to FIG. 3, in this embodiment, the common inlet passage 34 extends through a strut 58 passing through the gas path 24 of the gas turbine engine 10, between the low pressure compressor 14L and the high pressure compressor 14H. Although not shown, the common inlet passage 34 may circulate through a heat exchanger or other cooling system to reduce the temperature of the pressurized air bled from the high pressure compressor 14H. The fluid passages includes a passage 40a extending generally axially from the common inlet passage 34 toward the front of the engine 10 (toward the fan 12), and delivering the pressurized air against the seals 32a of the oil cavity containing the end bearing 64a supporting the end of the low pressure shaft 22.

The fluid passages also include another passage 38b extending generally axially from the common inlet passage 34 toward the rear of the engine 10. From this passage 38b stems a passage 40c directed axially forwardly and delivering the pressurized air against a seal 32c of the oil cavity containing the end bearing 64c supporting the end of the high pressure shaft 20 and another bearing 64e supporting the low pressure shaft 22; a passage 38d directed radially inwardly to communicate with a passage 38e defined between the high and low pressure shafts 20, 22; and a passage 40f directed axially rearwardly and defined between the high pressure shaft 20 and the bores 66 of the rotors of the high pressure compressor 14H.

The passage 38e between the two shafts 20, 22 delivers the pressurized air against other seals 32e of the oil cavity containing the end bearing 64c supporting the end of the high pressure shaft 20 and the bearing 64e supporting the low pressure shaft 22. The passage 40f defined between the high pressure shaft 20 and the bores 66 of the rotors of the high pressure compressor 14H communicates with other passages 40g delivering the pressurized air to the blades and vanes of the high pressure compressor 14H. Other passages may also be provided.

Referring to FIG. 4, it can be seen that the passage 38e between the two shafts 20, 22 is defined along the length of the high pressure shaft 20, and at the end of the high pressure shaft 20 communicates with the outlet passage 36 defined at the center of the hollow low pressure shaft 22, for example through one or more holes 68 defined through the annular wall of the low pressure shaft 22.

In this particular embodiment, the low pressure shaft 22 is engaged to surrounding components 70, such as an arm connected to the disks of the low pressure turbine blades, by an end bolt 72 applying a preloading to the assembly. The bolt 72 is received at the end of the low pressure shaft 22, within the outlet passage 36 defined through the low pressure shaft 22. The bolt 72 is hollow, and its outer surface is in contact with the inner surface of the shaft 22; accordingly, the air circulating through the outlet passage 36 must circulate through the hollow bolt 72 to reach the outlet 56, which is defined downstream of the bolt 72. The central opening of the bolt 72 is configured to define the venturi 60.

Accordingly, it can be seen that the inner wall defining the central opening of the bolt 72 has, from its upstream end to its downstream end, a first angled section 74 defining a tapering cross-section becoming progressively smaller, then an axial section 76 defining a constant cross-section corresponding to the smallest cross-section of the central opening, then a second angled section 78 defining a tapering cross-section becoming progressively larger. It can be seen from FIG. 4 that the venturi has a single inlet defined by the upstream end and a single outlet defined by the downstream end. It is understood that the cone angle formed by the walls in each angled section 74, 76 may be different from one another. In a particular embodiment, the walls in the second angled section 78 have a steeper slope that the walls in the first angled section 74.

It is understood that the venturi 60 can alternately be provided by the walls of one of the common passages in integral, monolithic form, instead of being provided by an element inserted into the passage.

In use, the secondary air system 30 thus circulates the pressurized air from the common source 50 through the fluid passages 34, 36, 38, 40 to deliver the pressurized air to the components 32 of the gas turbine engine 10. The pressurized air is exhausted from the fluid passages 34, 36, 38, 40 to the environment through the common outlet 56 located downstream of the components 32, and all the pressurized air exhausted through the outlet 56 circulates through at least one common fluid passage 34, 36, 38 before being exhausted. The flow is restricted in the common fluid passage 34, 36, 38 to control the pressure drop of the pressurized air throughout the fluid passages 34, 36, 38, 40, by circulation through the venturi 60.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine comprising:
   a compressor providing a source of pressurized air;
   a secondary air system including at least one flow path defining a fluid communication between the source of pressurized air and a common outlet communicating with an environment of the gas turbine engine, and a plurality of fluid passages communicating with the at least one flow path and with components of the gas turbine engine for delivery of the pressurized air thereto, the at least one flow path including a common fluid passage defining a venturi with a single inlet and a single outlet and configured such that all the pressurized air circulated to the common outlet passes through the venturi before reaching the common outlet, the venturi configured for controlling a flow of the pressurized air from the source of pressurized air to the common outlet and through the plurality of fluid passages,
   wherein the common fluid passage is defined through a low pressure shaft of the gas turbine engine, the venturi being defined at one end of the low pressure shaft, driven by a low pressure turbine, the communication between the common outlet and the source of pressurized air being provided through the low pressure shaft, and wherein at least a portion of the pressurized air entering the common fluid passage and venturi enters the common fluid passage through holes in the low pressure shaft from a passage defined between the low pressure shaft and a high pressure shaft, driven by a high pressure turbine, wherein the holes are located aft of the high pressure turbine with respect to a longitudinal axis of the gas turbine engine.

2. The gas turbine engine as defined in claim 1, wherein the components of the gas turbine engine communicating with the fluid passages include one or more of oil cavity seals, rotors, blades and vanes.

3. The gas turbine engine as defined in claim 1, wherein the venturi is located downstream with respect to the fluid passages communicating with the components of the gas turbine engine.

4. The gas turbine engine as defined in claim 1, wherein the common fluid passage including the venturi is an outlet passage adjacent to and in communication with the common outlet.

5. The gas turbine engine as defined in claim 1, wherein the venturi is defined by a central opening of a hollow bolt received within an outlet passage at the one end of the low pressure shaft, the hollow bolt engaging the low pressure shaft to a blade disk of the gas turbine engine.

6. The gas turbine engine as defined in claim 1, wherein the venturi is configured to limit the flow through the plurality of fluid passages at a first power level of the gas turbine engine without limiting the flow through the plurality of fluid passages at a second power level lower than the first power level, and wherein the flow through the fluid passages is from the source of pressurized air at the first and second power levels.

7. The gas turbine engine as defined in claim 1, wherein the compressor includes a plurality of rotors having blades rotatable in an annular gas path, the source of pressurized air being defined by a plenum in fluid communication with the annular gas path of the compressor.

8. The gas turbine engine as defined in claim 7, wherein the plurality of rotors includes at least one low pressure rotor drivingly engaged to the low pressure shaft and at least one high pressure rotor downstream of the at least one low pressure rotor and drivingly engaged to the high pressure shaft, the low and high pressure shafts being independently rotatable in a concentric manner, the plenum communicating with the annular gas path in proximity of one of the at least one high pressure rotors.

9. A gas turbine engine comprising:
a compressor defining a source of pressurized air;
a low pressure shaft engaged to a blade disk of a low pressure turbine by an end bolt located at one end of the low pressure shaft, the low pressure shaft driven by the low pressure turbine;
a high pressure shaft driven by a high pressure turbine;
a secondary air system including:
an inlet passage communicating with the source of pressurized air;
an outlet passage defined through the low pressure shaft and by an opening defined through the end bolt, the opening of the end bolt communicating with an environment of the gas turbine engine; and
a plurality of additional passages communicating with the inlet passage and with respective components of the gas turbine engine;
wherein the outlet passage has a section of constricted internal cross-section defined by a venturi having a single inlet and a single outlet and configured for controlling a flow of the pressurized air through the venturi, the plurality of additional passages communicating with the inlet passage upstream of the venturi,
and wherein at least a portion of the pressurized air entering the outlet passage and venturi enters the outlet passage through holes in the low pressure shaft from a passage defined between the low pressure shaft and the high pressure shaft, wherein the holes are located aft of the high pressure turbine with respect to a longitudinal axis of the gas turbine engine.

10. The gas turbine engine as defined in claim 9, wherein the venturi is defined in the opening of the end bolt.

11. The gas turbine engine as defined in claim 9, wherein the compressor includes a plurality of rotors having blades rotatable in an annular flow path, the source of pressurized air being defined by a plenum in fluid communication with the annular flow path of the compressor.

12. The gas turbine engine as defined in claim 10, wherein the plurality of rotors includes at least one low pressure rotor drivingly engaged to the low pressure shaft and at least one high pressure rotor downstream of the at least one low pressure rotor and drivingly engaged to the high pressure shaft, the low and high pressure shafts being independently rotatable in a concentric manner, the plenum communicating with the annular flow path immediately upstream of a most downstream one of the at least one high pressure rotors.

13. A method of pressurizing a secondary air system in a gas turbine engine, the method comprising:
circulating pressurized air from a source of pressurized air, through at least one flow path defining a fluid communication between the source of pressurized air and a common outlet communicating with an environment of the gas turbine engine, and to a plurality of interconnected fluid passages communicating with the at least one flowpath;
circulating the pressurized air through the fluid passages to deliver the pressurized air to a plurality of components of the gas turbine engine;
exhausting the pressurized air from the fluid passages and the at least one flowpath to the environment of the gas turbine engine through the common outlet located downstream of the plurality of components, the at least one flow path including a common fluid passage defining a venturi with a single inlet and a single outlet and configured such that all the pressurized air exhausted through the common outlet circulates through the venturi before being exhausted through the common outlet, the venturi configured for controlling a flow of the pressurized air from the source of pressurized air to the common outlet and through the plurality of fluid passages;
at low power, accelerating a flow of the pressurized air through the common fluid passage, the flow being accelerated by circulation through the venturi;
and at high power, choking the flow of the pressurized air through the venturi, wherein accelerating and choking the flow controls a pressure drop of the pressurized air throughout the fluid passages;
wherein the common fluid passage is defined through a low pressure shaft of the gas turbine engine, the venturi being defined at one end of the low pressure shaft, driven by a low pressure turbine, the communication between the common outlet and the source of pressurized air being provided through the low pressure shaft;
wherein at least a portion of the pressurized air entering the common fluid passage and venturi enters the common fluid passage through holes in the low pressure shaft from a passage defined between the low pressure shaft and a high pressure shaft, driven by a high pressure turbine;
and wherein the holes are located aft of the high pressure turbine with respect to a longitudinal axis of the gas turbine engine.

14. The method as defined in claim 13, wherein accelerating and choking the flow of the pressurized air is performed downstream of delivering the pressurized air to the plurality of components.

15. The method as defined in claim 13, wherein accelerating and choking the flow of the pressurized air is performed in the low pressure shaft of the gas turbine engine.

16. The method as defined in claim 13, wherein circulating the pressurized air from the source includes circulating the pressurized air from a plenum communicating with a gas path of the gas turbine engine between stages of a high pressure compressor thereof.

* * * * *